US007724622B2

(12) United States Patent
Masuda

(10) Patent No.: US 7,724,622 B2
(45) Date of Patent: May 25, 2010

(54) RECORDING DEVICE CAPABLE OF DETERMINING THE MEDIA TYPE BASED ON DETECTING THE CAPACITANCE OF PAIR ELECTRODES

(75) Inventor: Noriaki Masuda, Yokohama (JP)

(73) Assignee: Freescale Semiconductor, Inc., Austin, TX (US)

( * ) Notice: Subject to any disclaimer, the term of this patent is extended or adjusted under 35 U.S.C. 154(b) by 553 days.

(21) Appl. No.: 11/764,810

(22) Filed: Jun. 19, 2007

(65) Prior Publication Data

US 2008/0316883 A1 Dec. 25, 2008

(51) Int. Cl.
*G11B 20/18* (2006.01)

(52) U.S. Cl. .................................. 369/53.2; 369/53.41

(58) Field of Classification Search ................ 369/53.2, 369/53.41, 30.27; 720/617, 626, 619, 627, 720/628, 629, 645

See application file for complete search history.

(56) References Cited

U.S. PATENT DOCUMENTS 4,618,950 A * 10/1986 Abe et al. ................ 369/30.12
4,638,374 A * 1/1987 Yoshitake et al. ............. 386/47
4,646,282 A * 2/1987 Mizuno et al. .............. 369/126
5,191,569 A 3/1993 Kurosawa et al.
5,793,728 A 8/1998 Selby et al.
5,828,641 A 10/1998 Abe et al.
6,414,318 B1 * 7/2002 Uber et al. .................. 250/389
6,421,312 B1 7/2002 Liao et al.
7,042,663 B2 5/2006 Shimotono et al.
7,180,840 B1 2/2007 Kim
7,327,662 B2 * 2/2008 Kobayashi et al. ..... 369/112.05
2002/0131335 A1 * 9/2002 Fujita ...................... 369/30.36
2004/0037178 A1 2/2004 Nagano et al.
2006/0250913 A1 11/2006 Kim

FOREIGN PATENT DOCUMENTS

JP 2003346336 A 12/2003
JP 2005302083 A 10/2005

* cited by examiner

*Primary Examiner*—Tan X Dinh
(74) *Attorney, Agent, or Firm*—Charles Bergere

(57) ABSTRACT

A device enabling simple detection of a recording medium placed on a tray includes at least two electrodes arranged on the tray, an electric field sensor connected to the electrodes, and a control circuit connected to the electric field sensor. The electric field sensor detects capacitance in accordance with the distance between the electrodes relative to the recording medium placed on the tray. The control circuit determines the recording media type of the recording medium based on the capacitance detected by the electric field sensor.

15 Claims, 6 Drawing Sheets

22
100
104 106
d
102 32
10
106 100 104 102
22
32 30
SC
Control Circuit
Electric Field Sensor
Vsense
40
50

10
22
102
104
100
106
30
32
40
Electric Field Sensor
SC
Vsense
50
Control Circuit
d
22

20
22
24
30
30a
30c
26
30b
28
32b
32c
32a
32

RECORDING DEVICE CAPABLE OF DETERMINING THE MEDIA TYPE BASED ON DETECTING THE CAPACITANCE OF PAIR ELECTRODES

BACKGROUND OF THE INVENTION

The present invention relates to a device and method for detecting a recording medium.

In the prior art, various devices for detecting the type of a recording medium (media type) have been proposed. For example, Japanese Laid-Open Patent Publication No. 2003-346336 describes a detection device that emits laser light toward an optical disc, detects the reflected light, and compares a signal level of the reflected light with a predetermined threshold to determine the media type. Japanese Laid-Open Patent Publication No. 2005-302083 describes an optical disc recorder that emits laser light toward the recording surface of an optical disc to recognize the media type based on variations in the signal level of the reflected light, the intensity of the signal level, and fluctuation tendencies in the signal level relative to the intensity of the emitted laser light.

The prior art devices described in the above publications detect the media type using reflected laser light. This results in complicated processing. Further, the media type may not be accurately detected when the surface of the optical disc includes a scratch or a smear.

The prior art devices also cannot detect the media type unless an optical disc is loaded into a drive device. In other words, the optical device cannot be detected when a media tray projects from the drive device. Thus, there is no way to determine whether or not the optical disc is properly set on the media tray before retraction of the media tray into the drive device.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
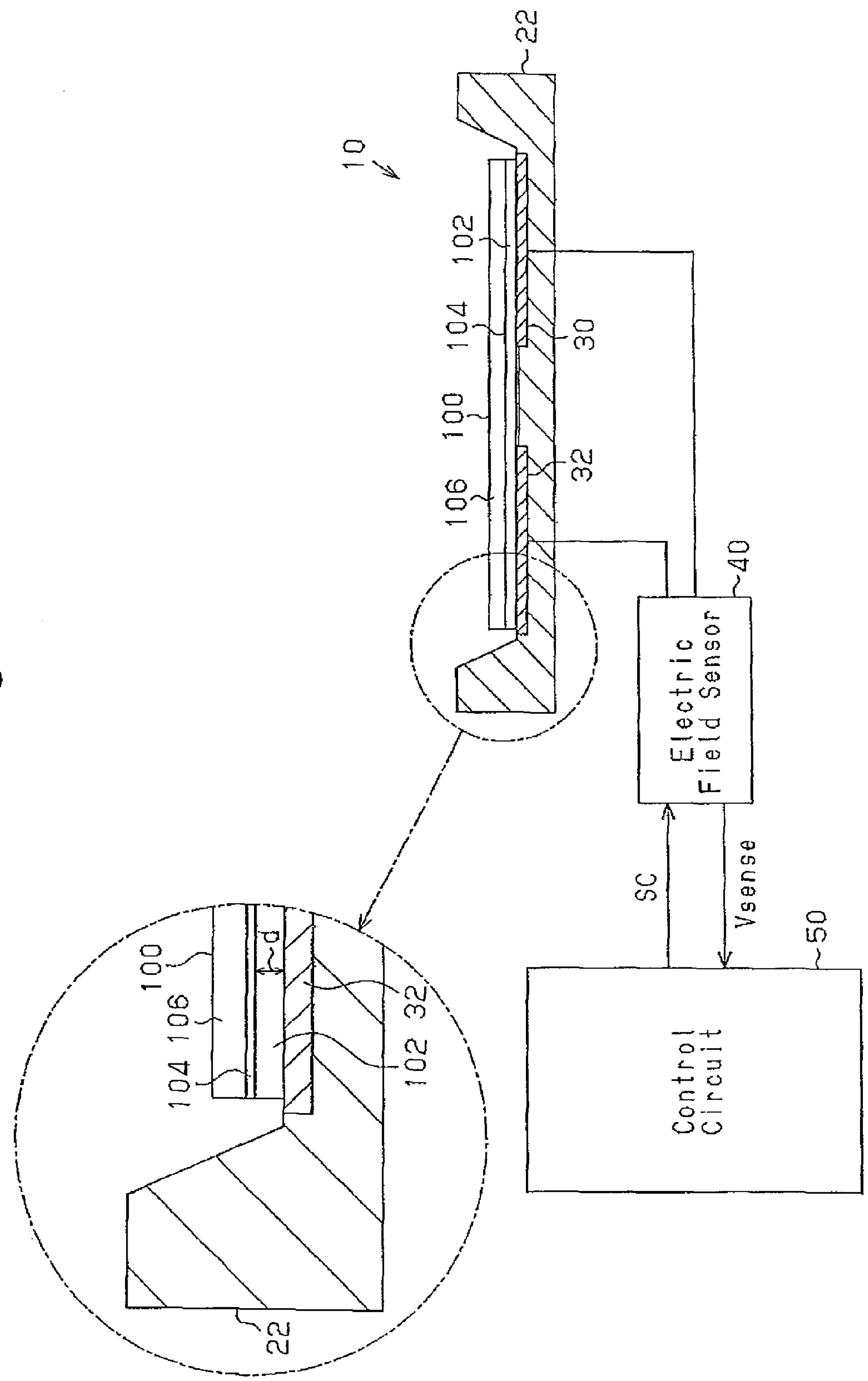
FIG. 1 is a schematic diagram showing a media detection device according to a first embodiment of the present invention.

In the drawings, like numerals are used for like elements throughout. The present invention provides a device and method enabling easy detection of a recording medium set on a media tray.

One aspect of the present invention is a device for detecting a recording medium placed on a tray. The device includes at least two electrodes arranged on the tray. An electric field sensor is connected to the electrodes to detect capacitance with respect to distance between the electrodes relative to the recording medium placed on the tray.

Another aspect of the invention is a method for recording media type recognition of a recording medium placed on a tray. The detection device includes at least two electrodes arranged on the tray and an electric field sensor connected to the electrodes. The method includes detecting capacitance in accordance with the distance between the electrodes relative to the recording medium placed on the tray with the electric field sensor, and recognizing the recording media type based on the capacitance detected by the electric field sensor.

A further aspect of the present invention is a method for detecting where a recording medium placed on a tray is located with use of a detection device. The detection device includes at least two electrodes arranged on the tray and an electric field sensor connected to the electrodes. The method includes detecting capacitance in accordance with the distance between the electrodes relative to the recording medium placed on the tray with the electric field sensor, and determining where the recording medium is located on the tray based on the capacitance detected by the electric field sensor.

Other aspects and advantages of the present invention will become apparent from the following description, taken in conjunction with the accompanying drawings, illustrating by way of example the principles of the invention.

A media detection device 10 according to a first embodiment of the present invention will now be discussed with reference to FIGS. 1 to 7.

FIG. 1 is a schematic diagram showing the entire structure of the media detection device 10. The media detection device 10 includes two electrodes 30 and 32, an electric field sensor 40 connected to the electrodes 30 and 32, and a control circuit 50 connected to the electric field sensor 40. The electric field sensor 40 and the control circuit 50 are arranged in a drive device 20 (FIG. 2) into which a recording medium 100 is loaded. The two electrodes 30 and 32 are arranged on a media tray 22, which is projectable from and retractable into the drive device 20. The media tray 22 is configured so that the recording medium 100 can be placed on the two electrodes 30 and 32. FIG. 1 schematically shows the cross-sectional shapes of the recording medium 100 and the media tray 22.

The recording medium 100 is an optical disc, such as a compact disc (hereafter referred to as a CD), a digital versatile disc (hereafter referred to as a DVD), or a Blu-ray Disc™ (hereafter referred to as a BD). More specifically, a CD may be an optical disc that is in compliance with any of a plurality of CD standards, such as a CD-ROM (read only memory), a CD-R (recordable), and a CD-RW (rewritable). A DVD may be an optical disc that is in compliance with any of a plurality of DVD standards, such as a DVD-ROM, a DVD-R, a dual layer DVD-R, a DVD-RW, a DVD-RAM (random access memory), an HDDVD™-R (high-definition digital versatile disc recordable). A BD may be an optical disc that is in compliance with any of a plurality of BD standards, such as a BD-R and a BR-RW. The drive device 20, which is applicable to the CD standard, the DVD standard, and the BD standard, emits laser light from an optical pickup (not shown) in accordance with the standard of the recording medium 100 to control the writing and reading of data.

Figure 2:
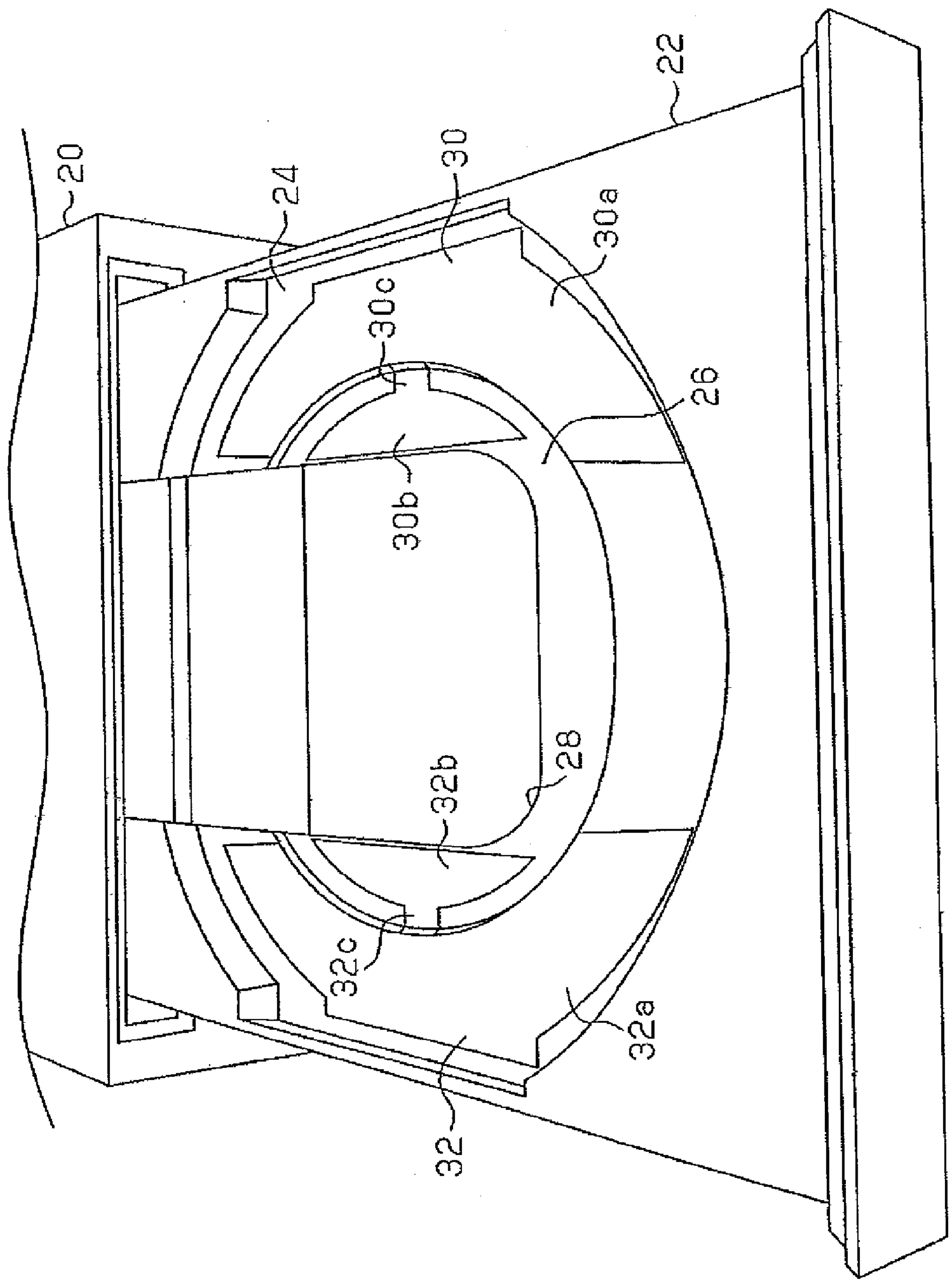
FIG. 2 is a perspective view showing two electrodes of the detection device of FIG. 1.

Referring to FIG. 2, the media tray 22 includes a first seat surface 24 on which a recording medium having a diameter of 12 cm is receivable and a second seat surface 26 on which a recording medium having a diameter of 8 cm is receivable. The second seat surface 26 is located at the inner side of the first seat surface 24 and is lower than the first seat surface 24. A cutout portion 28 is defined in the center of the media tray 22 extending through the first and second seat surfaces 24 and 26.

The two electrodes 30 and 32 are fixed to the first and second seat surfaces 24 and 26 of the media tray 22. Since the electrodes 30 and 32 have identical structures, the structure of only the electrode 30 will be described. The electrode 30 includes a first electrode portion 30*a* fixed to the first seat surface 24, a second electrode portion 30*b* fixed to the second seat surface 26, and a connection portion 30*c* connecting the first and second electrode portions 30*a* and 30*b*. The first electrode portion 30*a* is arcuate, and the second electrode portion 30*b* is semicircular. However, the first and second electrode portions 30*a* and 30*b* do not necessarily have to be shaped as shown in FIG. 2. Preferably, the electrode portions 30*a* and 30*b* are formed so as to provide a large area of contact with the corresponding recording media. The electrode 32 is formed identically to the electrode 30. More specifically, the electrode 32 includes a first electrode portion 32*a*, a second electrode portion 32*b*, and a connection portion 32*c* located between the first and second electrode portions 32*a* and 32*b*. The electrodes 30 and 32 have the same area.

Referring to FIG. 1, the recording medium 100 includes a protective layer (resin layer) 102, a recording layer 104 having a metal film, and a substrate 106 having a printing surface. Data is recorded to the recording layer 104. The recording medium 100 is set on the media tray 22 with the protective layer 102 facing downwards. When the recording medium 100 is properly set at the appropriate position on the media tray 22, the electrodes 30 and 32 come into contact with the protective layer 102 of the recording medium 100.

The control circuit 50 controls the electric field sensor 40. The electric field sensor 40 transmits a predetermined sine wave signal to the electrodes 30 and 32 in response to a control signal SC, which is transmitted from the control circuit 50. Based on the fluctuation amount of the amplitude and phase of the sine wave signal at the electrodes 30 and 32, the electric field sensor 40 detects capacitance C, which is in accordance with the distance d from the recording layer 104 of the recording media 100 to the electrodes 30 and 32. The electric field sensor 40 generates a sense voltage Vsense, which indicates the detected capacitance D, and transmits the sense voltage Vsense to the control circuit 50.

The capacitance C detected by the electric field sensor 40 is expressed by the next equation.

$$C=k\epsilon_0 A/D \qquad \text{equation 1}$$

In equation 1, k represents the dielectric constant of the substance between the electrodes 30 and 32. In the first embodiment, k corresponds to the dielectric constant of the protective layer 102. Further, $\epsilon_0$ represents the vacuum dielectric constant ($8.85\times10^{12}$ F/m), A represents the area ($m^2$) of each of the electrodes 30 and 32, and D represents the distance (m) between the electrodes 30 and 32. When the recording medium 100 is properly set at the appropriate position on the media tray 22 (first seat surface 24 or second seat surface 26), the distance D is expressed as 2d. That is, the distance D corresponds to the distance between the electrodes 30 and 32 relative to the recording layer 104 of the recording medium 100 (2*d*).

[Recognition of Media Type]

The control circuit 50 recognizes the media type of the recording medium 100 based on the sensor voltage Vsense measured by the electric field sensor 40. For example, when the media tray 22 is projected from the drive device 20, the electric field sensor 40 starts a sensing operation in response to a command from the control circuit 50. The electric field sensor 40 detects the capacitance C, which corresponds to the distance d of the electrodes 30 and 32 from the recording layer 104 of the recording media 100 on the media tray 22. Then, the electric field sensor 40 transmits the sense voltage Vsense, which indicates the detection, to the control circuit 50.

Figure 3A:
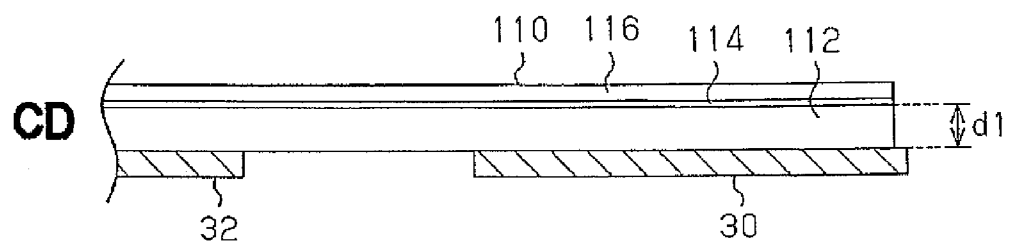
FIG. 3A is a schematic cross-sectional view of a CD.
Figure 3B:
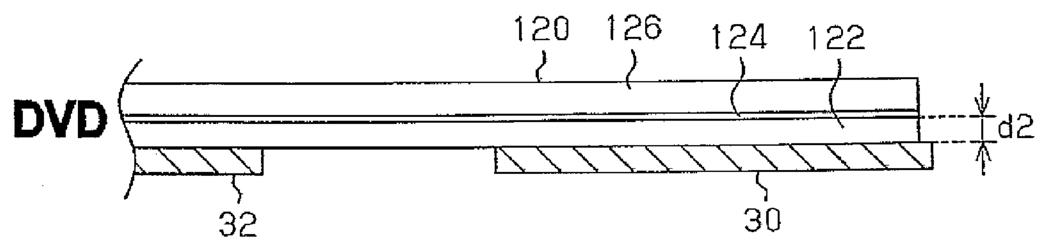
FIG. 3B is a schematic cross-sectional view of a DVD.
Figure 3C:
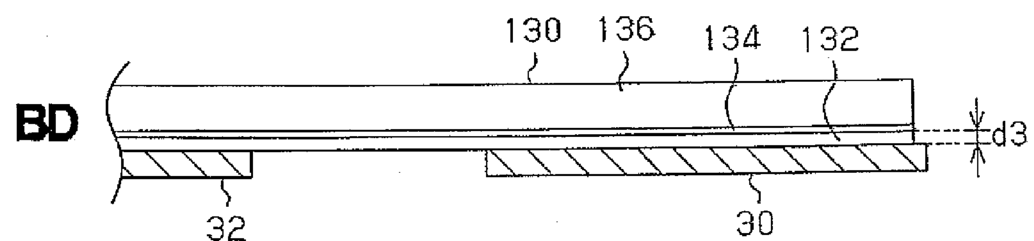
FIG. 3C is a schematic cross-sectional view of a BD.

FIGS. 3A, 3B, and 3C are schematic cross-sectional views showing three recording media of different media types. FIG. 3A shows a CD 110, FIG. 3B shows a DVD 120, and FIG. 3C shows a ED 130.

In the case of the CD 110, the distance d1 from the surface of a protective layer 112 to a recording layer 114 between the protective layer 112 and a substrate 116 is approximately 1.2 mm. In the case of the DVD 120 (including a single-side dual layer DVD and an HDDVD), the distance d2 from the surface of a protective layer 122 to a recording layer 124 between the protective layer 122 and a substrate 126 is approximately 0.6 mm. In the case of the BD 130, the distance d3 from the surface of a protective layer 132 to a recording layer 134 between the protective layer 132 and a substrate 136 is approximately 0.1 mm.

When a recording medium is properly placed on the tray 22, the distance between the electrodes 30 and 32 relative to the recording layer of the recording medium (i.e., the distance D in equation 1) differs between the CD 110, the DVD 120, and the BD 130. Accordingly, the capacitance C detected by the electric field sensor 40 differs between different media types. For example, when the capacitances detected for the CD 110, the DVD 120, and the BD 130 are respectively represented by C1, C2, and C3, the relationship of C1<C2<C3 is satisfied. Accordingly, the CD 110, the DVD 120, and the BD 130 respectively have sense voltages V1, V2, and V3 that satisfy the relationship of V1>V2>V3.

The control circuit 50 compares the sense voltage Vsense measured by the electric field sensor 40 with a first threshold voltage Vth1 and a second threshold voltage Vth2. The first threshold voltage Vth1 is set at a value enabling the CD 110 to be distinguished from the DVD 120. The second threshold voltage Vth2 is set at a value enabling the DVD 120 to be distinguished from the BD 130. Accordingly, the first threshold voltage Vth1 is higher than the second threshold voltage Vth2.

When the sense voltage Vsense is greater than the first threshold voltage Vth1, the control circuit 50 determines that the recording medium 100 is the CD 110. When the sense voltage Vsense is between the first threshold voltage Vth1 and the second threshold voltage Vth2, the control circuit 50 determines that the recording medium 100 is the DVD 120. When the sense voltage Vsense is less than the second threshold voltage Vth2, the control circuit 50 determines that the recording medium 100 is the BD 130.

Figure 4:
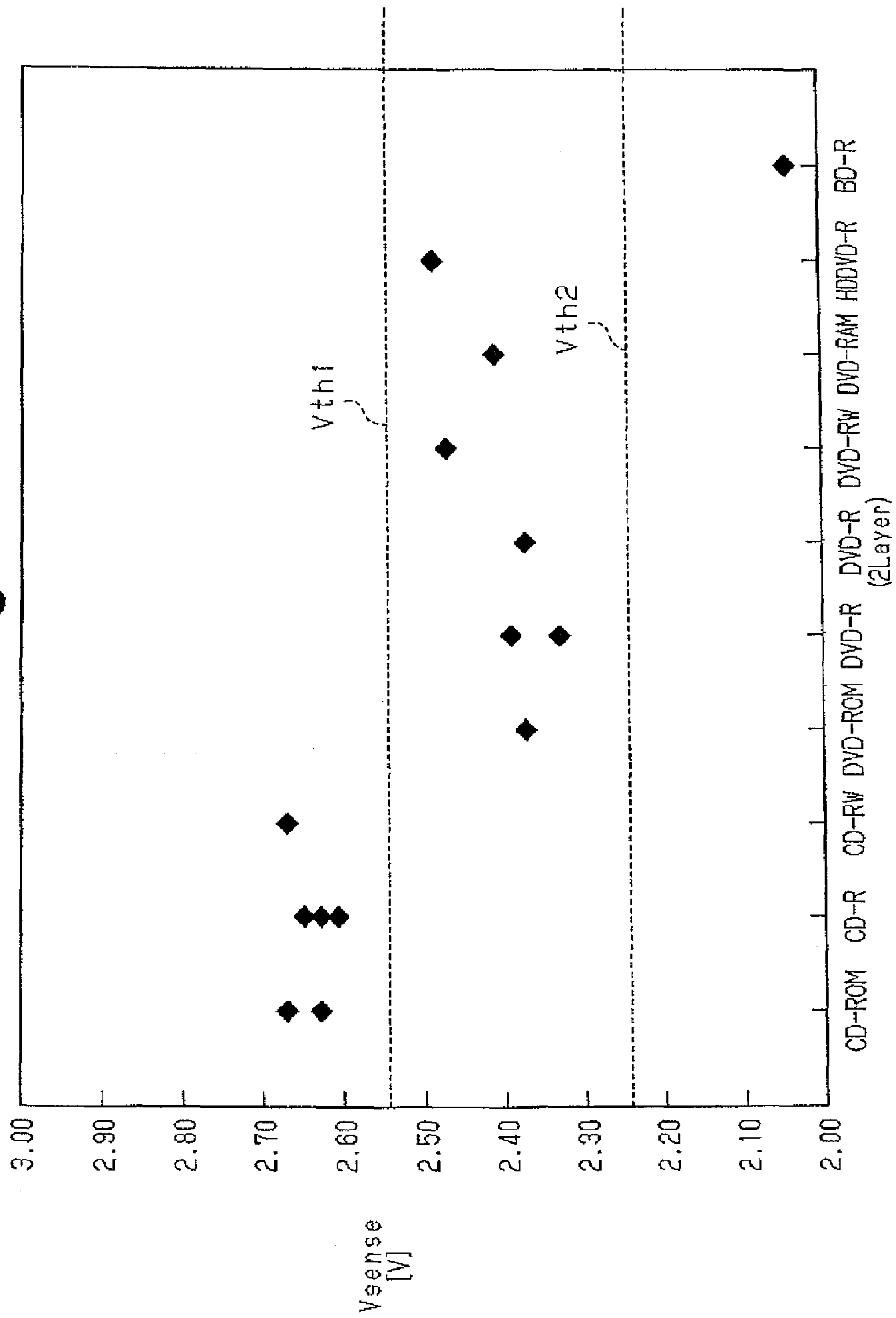
FIG. 4 is a graph showing detections of an electric field sensor shown in FIG. 1 indicating the media type.

FIG. 4 is a graph showing detections (measurement values) of the electric field sensor 40 indicating the media type. The graph shows the measurement values of the sense voltage Vsense for three CD standards (CD-ROM, CD-R, and CD- RW), six DVD standards (DVD-ROM, DVD-R, dual layer DVD-R, DVD-RW, DVD-RAM, and HDDVD-R), and one BD standard (BD-R).

As shown in FIG. 4, for a CD standard, the sense voltage Vsense is measured in a range of approximately 2.60 V to 2.70 V. For a DVD standard, the sense voltage Vsense is measured in a range of approximately 2.30 V to 2.50 V. For a BD standard, the sense voltage Vsense is measured in the vicinity of approximately 2.00 V. Based on such measurement values, the first threshold voltage Vth1 is set at, for example, 2.55 V, and the second threshold value Vth2 is set at, for example, 2.25 V in the preferred embodiment. Accordingly, when the sense voltage Vsense is greater than 2.55 V, the control circuit 50 determines that the media type is CD. When the sense voltage Vsense is in the range of 2.25 V to 2.55 V, the control circuit 50 determines that the media type is DVD. When the sense voltage Vsense is less than 2.25 V, the control circuit 50 determines that the media type is BD.

[Detection of Medium Position]

Based on the sense voltage Vsense measured by the electric field sensor 40, the control circuit 50 detects the position of the recording medium 100 on the tray 22. For example, when the media tray 22 is projected from the drive device 20, the electric field sensor 40 starts a sensing operation in response to a command from the control circuit 50.

Figure 5A:
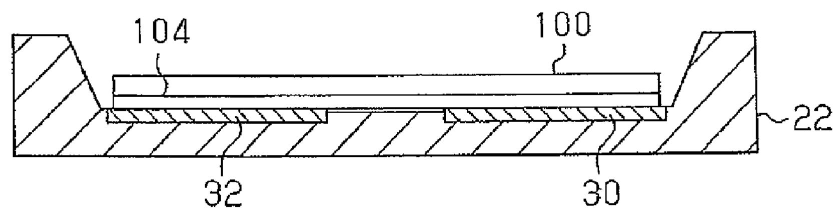
FIG. 5A is a cross-sectional diagram showing a recording medium set on a tray in a proper state.
Figure 5B:
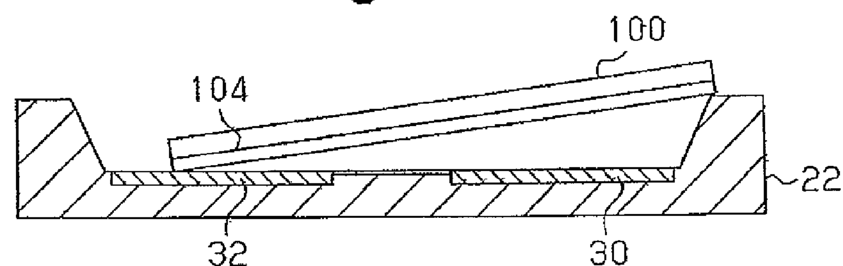
FIG. 5B is a cross-sectional diagram showing a recording medium set on a tray in an inclined state.
Figure 5C:
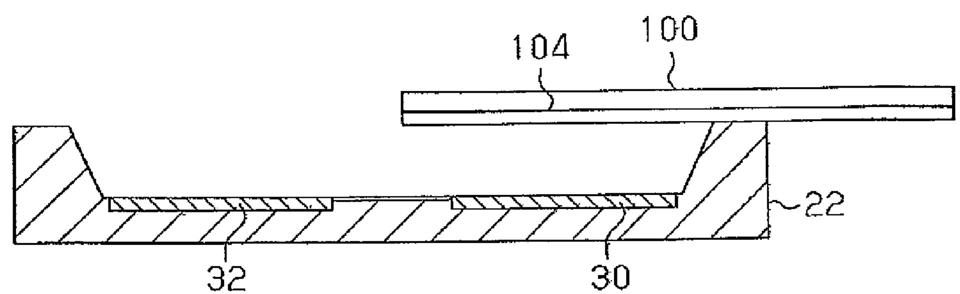
FIG. 5C is a cross-sectional diagram showing a recording medium set on a tray in a state of non-contact with the electrodes.

FIGS. 5A, 5B, and 5C are schematic cross-sectional views showing the recording medium 100 arranged at different positions on the tray 22.

FIG. 5A shows the recording medium 100 in a state properly set on the tray 22. In this case, the control circuit 50 can recognize the type (CD, DVD, or BD) of the recording medium 100 on the tray 22 from the sense voltage Vsense received from the electric field sensor 40. That is, the electric field sensor 40 detects the capacitance C, which is in accordance with the media type.

Figure 6:
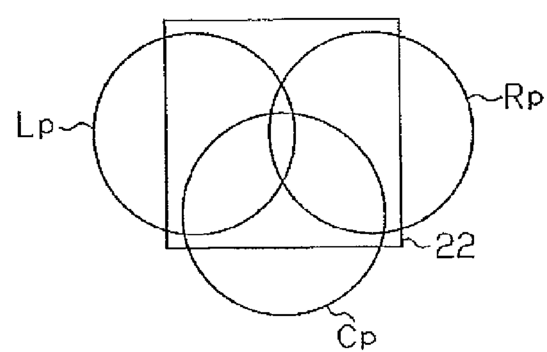
FIG. 6 is a schematic diagram showing a recording medium in states displaced from the tray.

FIG. 5B shows the recording medium 100 set on the tray 22 in an inclined state contacting part of an electrode. In this case, as shown in FIG. 6, it can be considered that the recording medium 100 is displaced to a leftward position Lp, a rightward position Rp, or a forward position Cp from the proper position on the tray 22. In this inclined state, the distance from the recording layer 104 of the recording medium 100 to the electrodes 30 and 32 is longer than that in the normal state (FIG. 5A). Accordingly, the capacitance C detected by the electric field sensor 40 is greater than that that in the normal state.

FIG. 5C shows the recording medium 100 set on the tray 22 in a state of non-contact with the electrodes 30 and 32. In this case, as shown in FIG. 6, it can also be considered that the recording medium 100 is displaced to the leftward position Lp, the rightward position Rp, or the forward position Cp from the proper position on the tray 22. In this non-contact state, the distance from the recording layer 104 of the recording medium 100 to the electrodes 30 and 32 is longer than that in the inclined state (FIG. 5B). Accordingly, the capacitance C detected by the electric field sensor 40 is greater than that in the inclined state.

Figure 7:
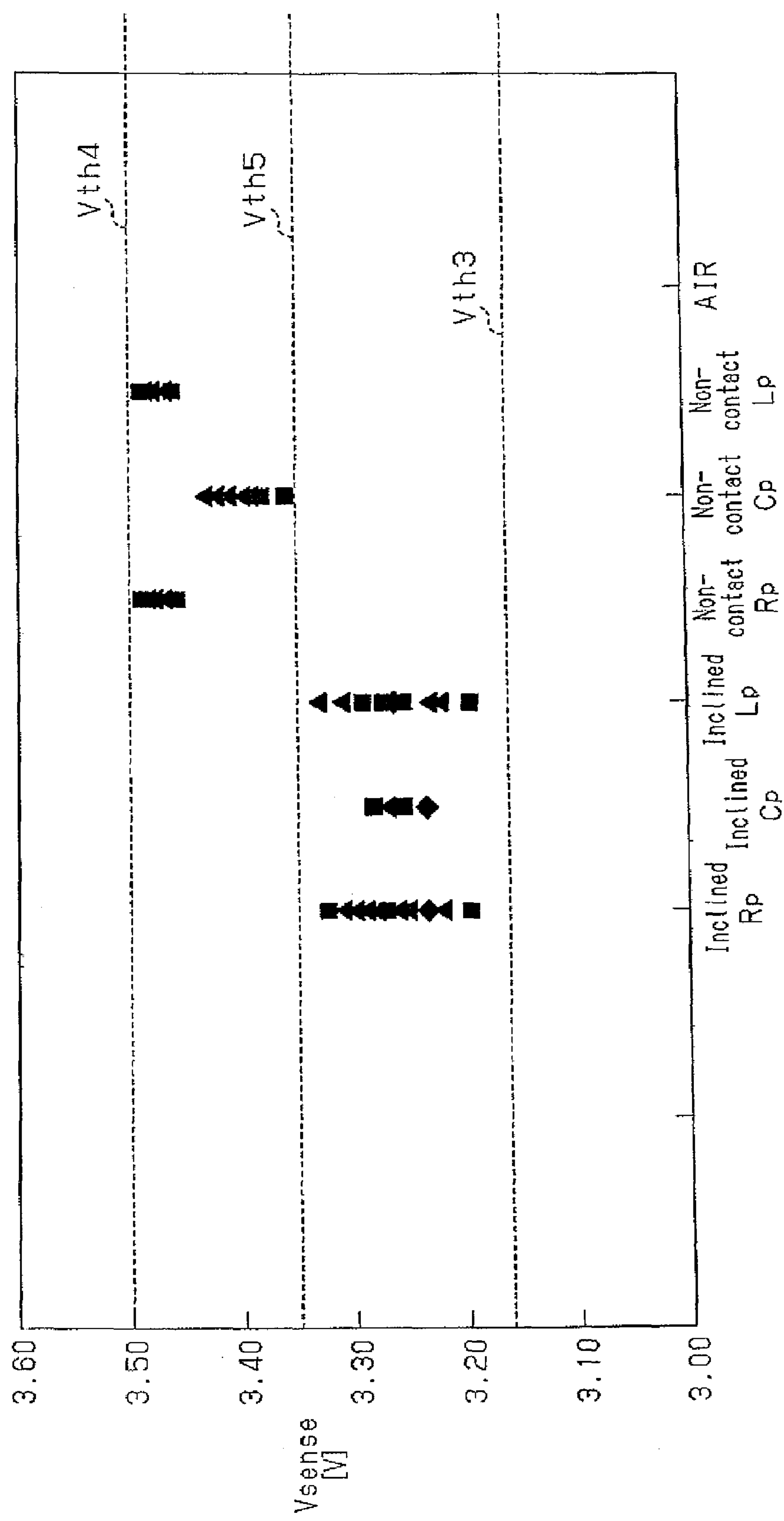
FIG. 7 is a graph showing detections of the electric field sensor of FIG. 1 indicating the medium position.

FIG. 7 is a graph showing detections (measurement values) of the electric field sensor 40 indicating the medium position. The graph shows the measurement values of the sense voltage Vsense when the recording medium 100 (any type) is in an inclined state and a non-contact state. In FIG. 7, "AIR" indicates a state in which the recording medium 100 does not exist on the tray 22.

As shown in FIG. 7, in the inclined state (Rp, Cp, Lp), the sense voltage Vsense is measured within the range of approximately 3.20 V to 3.35 V. In the non-contact state (Rp, Cp, Lp), the sense voltage Vsense is measured within the range of approximately 3.35 V to 3.50 V. Based on such measurement values, in the preferred embodiment, a third threshold voltage Vth3 is set at, for example, 3.15 V, and a fourth threshold voltage Vth4 is set at, for example, 3.50 V.

When the sense voltage Vsense measured by the electric field sensor 40 is between the third threshold voltage Vth3 (3.15 V) and the fourth threshold voltage Vth4 (3.50 V), the control circuit 50 determines that the recording medium 100 is located at an abnormal position on the tray 22. That is, the control circuit 50 determines that the recording medium 100 on the tray 22 is in an inclined state or a non-contact state.

When the sense voltage Vsense is less than the third threshold voltage Vth3, the control circuit 50 determines that the recording medium 100 is properly set on the tray 22 (i.e., the first seat surface 24 or the second seat surface 26). In this case, the control circuit 50 recognizes the type of the recording medium 100 based on the sense voltage Vsense.

When the sense voltage Vsense is greater than the fourth threshold voltage Vth4 or when the sense voltage Vsense is 0 V, the control circuit 50 determines that the recording medium 100 does not exist on the tray 22 ("AIR").

Accordingly, the control circuit 50 detects proper setting of the recording medium 100 on the tray 22 based on the sense voltage Vsense measured by the electric field sensor 40.

The media detection device 10 of the preferred embodiment has the advantages described below.

(1) The media detection device 10 measures the capacitance C (Vsense), which is in accordance with the distance from the recording layer 104 of the recording medium 100 to the electrodes 30 and 32, with the electric field sensor 40 to recognize the medium type. This eliminates the need for laser light, which is used in the prior art, and facilitates the process for recognizing the media type.

(1A) The media detection device 10 is capable of recognizing three media types, which are CD, DVD, and BD.

(2) The media detection device 10 measures the capacitance C (Vsense), which is in accordance with the distance from the recording layer 104 of the recording medium 100 to the electrodes 30 and 32, with the electric field sensor 40 to recognize the position of the recording media 100 on the tray 22. This enables detection of the position of the recording medium 100 even when the media tray 22 is projected from the drive device 20.

(2A) Based on the sense voltage Vsense of the electric field sensor 40, the media detection device 10 recognizes whether the recording medium 100 is set on or removed from the tray 22. In a state in which the tray 22 is projected from the drive device 20, the detection of whether or not the recording medium 100 is set on the tray 22 is possible. This enables automatic retraction of the tray 22 in cooperation with the detection of the recording media 100.

(2B) Based on the sense voltage Vsense of the electric field sensor 40, the media detection device 10 recognizes whether the recording medium 100 is properly set on the tray 22. Thus, retraction of the tray 22 may be prohibited when the recording medium 100 is not properly set. This would prevent damages from being inflicted to the recording medium 100 when the tray 22 is retracted.

(3) The electric field sensor 40 is used to perform media detection. Thus, even when the surface of the recording media 100 includes scratches or smears, media detection is performed with higher accuracy in comparison to when using laser light.

It should be apparent to those skilled in the art that the present invention may be embodied in many other specific forms without departing from the spirit or scope of the invention. Particularly, it should be understood that the present invention may be embodied in the following forms.

The two electrodes 30 and 32 may be embedded in the tray 22. In this case, the electric field sensor 40 detects the capacitance C based on the sum of the distance from the surface (seat surface) of the tray 22 to the electrodes 30 and 32 and the thickness of the protective layer 102 of the recording medium 100.

The number of electrodes is not limited to two. For example, four electrodes may be arranged on the tray 22.

The two electrodes 30 and 32 may be formed so as to contact substantially the entire recording medium 100.

The first to fourth threshold voltages Vth1, Vth2, Vth3, and Vth4 are not limited to the values of the preferred embodiment. The first threshold voltage Vth1 is preferably set at an intermediate value between the minimum sense voltage for detection of a CD and the maximum sense voltage for detection of a DVD. In the same manner, the second threshold voltage Vth2 is preferably set at an intermediate value between the minimum sense voltage for detection of a DVD and the maximum sense voltage for detection of a BD. The third threshold value Vth3 need only be a value that is greater than the maximum sense voltage for detection of a CD.

The inclined state of the recording medium 100 may be distinguished from the non-contact state of the recording medium 100. In such a case, referring to FIG. 5, a fifth threshold voltage Vth5 (e.g., 3.35 V) may be set to distinguish the inclined state from the non-contact state.

The media detection device 10 may further detect whether or not a finger is contacting the recording medium 100 on the tray. The capacitance detected by the electric field sensor 40 differs when a finger is contacting the recording medium 100 and when a finger is not contacting the recording medium 100. This would prevent retraction of the tray 22 when a finger is contacting the recording medium 100.

The present examples and embodiments are to be considered as illustrative and not restrictive, and the invention is not to be limited to the details given herein, but may be modified within the scope and equivalence of the appended claims.

What is claimed is:

1. A device for detecting a recording medium placed on a tray, wherein the recording medium includes a recording layer, the device comprising:

at least two electrodes arranged on the tray;

an electric field sensor connected to the at least two electrodes to detect capacitance in accordance with a distance between the electrodes relative to the recording medium placed on the tray and generates a sense voltage indicating the detection; and a control circuit, connected to the electric field sensor, for recognizing a media type of the recording medium based on the capacitance detected by the electric field sensor, and determines whether the sense voltage is greater than a first threshold voltage to recognize that the recording medium belongs to a first recording media group when the sense voltage is higher than the first threshold voltage and recognize that the recording medium belongs to a second recording media group when the sensor voltage is less than the first threshold voltage.

2. The device according to claim 1, wherein the tray includes a seat surface on which the recording medium is received and the at least two electrodes are arranged on the seat surface of the tray.

3. The device according to claim 1, wherein the tray includes a first seat surface on which the recording medium is received when the recording medium has a first size and a second seat surface on which the recording medium is received when the recording medium has a second size; and the at least two electrodes each include a first electrode portion located on the first seat surface and a second electrode portion connected to the first electrode portion and located on the second seat surface.

4. The device according to claim 1, wherein the at least two electrodes are embedded in the tray.

5. The device according to claim 1, wherein the control circuit further determines whether the sense voltage is greater than a second threshold voltage that is lower than the first threshold voltage to recognize that the recording medium belongs to the second recording media group when the sense voltage is between the first threshold voltage and the second threshold voltage and that the recording medium belongs to a third recording media group when the sense voltage is less than the second threshold voltage.

6. The device according to claim 5, wherein:

the first recording media group includes a plurality of compact discs of different standards;

the second recording media group includes a plurality of digital versatile discs of different standards; and the third recording media group includes a plurality of Blu-ray discs of different standards.

7. The device according to claim 1, wherein the control circuit determines where the recording medium is located on the tray based on the capacitance detected by the electric field sensor.

8. The device according to claim 7, wherein:

the control circuit determines whether the sense voltage is greater than a third threshold voltage and determines that the recording medium is located at an abnormal position on the tray when the sense voltage is greater than the third threshold voltage.

9. The device according to claim 8, wherein the control circuit further determines whether the sense voltage is greater than a fourth threshold voltage that is higher than the third threshold voltage and determines that the recording medium does not exist on the tray when the sense voltage is greater than the fourth threshold voltage.

10. A method for determining media type of a recording medium placed on a tray using a detection device, wherein the detection device includes at least two electrodes arranged on the tray and an electric field sensor connected to the at least two electrodes, the method comprising:

detecting capacitance in accordance with a distance between the electrodes relative to the recording medium placed on the tray with the electric field sensor;

determining the recording media type of the recording medium based on the detected capacitance;

generating a sense voltage indicating the detected capacitance;

determining whether the sense voltage is greater than a first threshold voltage to generate a first determination result; and determining from the first determination result that the recording medium belongs to a first recording media group when the sense voltage is greater than the first threshold voltage and recognizing that the recording medium belongs to a second recording media group when the sensor voltage is less than the first threshold voltage.

11. The method according to claim 10, wherein:

the recording medium includes a recording layer; and the detecting capacitance includes detecting capacitance in accordance with the distance between the electrodes relative to the recording layer of the recording medium.

12. The method according to claim 10, further comprising:

determining whether the sense voltage is greater than a second threshold voltage that is lower than the first threshold voltage to generate a second determination result;

determining from the first determination result and the second determination result that the recording medium belongs to the second recording media group when the sense voltage is between the first threshold voltage and the second threshold voltage and that the recording medium belongs to a third recording media group when the sense voltage is less than the second threshold voltage.

13. A method for detecting where a recording medium placed on a tray is located with use of a detection device, wherein the detection device includes at least two electrodes arranged on the tray and an electric field sensor connected to the at least two electrodes, the method comprising:

detecting capacitance in accordance with a distance between the electrodes relative to the recording medium placed on the tray with the electric field sensor;

determining where the recording medium is located on the tray based on the detected capacitance;

generating a sense voltage indicating the detected capacitance; and determining whether the sense voltage is greater than a third threshold voltage, wherein the determining where the recording medium is located includes determining that the recording medium is located at an abnormal position on the tray when the sense voltage is greater than the third threshold voltage.

14. The method according to claim 13, wherein:

the recording medium includes a recording layer;

the detecting capacitance includes detecting capacitance in accordance with the distance between the electrodes relative to the recording layer of the recording medium.

15. The method according to claim 13, further comprising:

determining whether the sense voltage is greater than a fourth threshold voltage that is higher than the third threshold voltage;

wherein the determining where the recording medium is located includes determining that the recording medium does not exist on the tray when the sense voltage is greater than the fourth threshold voltage.

* * * * *